US012421481B2

United States Patent
Adedeji et al.

(10) Patent No.: US 12,421,481 B2
(45) Date of Patent: Sep. 23, 2025

(54) PHOTON-INDUCED ACCELERATED ENZYMES AND BIOACTIVE COMPOUNDS ACCUMULATION IN BARLEY DURING MALTING

(71) Applicant: University of Kentucky Research Foundation, Lexington, KY (US)

(72) Inventors: Akinbode A. Adedeji, Lexington, KY (US); Al Fadhl Y. Al Khaled, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 42 days.

(21) Appl. No.: 17/863,024

(22) Filed: Jul. 12, 2022

(65) Prior Publication Data
US 2023/0021857 A1     Jan. 26, 2023

Related U.S. Application Data

(60) Provisional application No. 63/220,724, filed on Jul. 12, 2021.

(51) Int. Cl.
| | | |
|---|---|---|
| C12C 1/047 | (2006.01) | |
| C12C 1/067 | (2006.01) | |
| C12C 1/18 | (2006.01) | |

(52) U.S. Cl.
CPC .............. *C12C 1/047* (2013.01); *C12C 1/067* (2013.01); *C12C 1/18* (2013.01)

(58) Field of Classification Search
CPC .............. C12C 1/047; C12C 1/18; C12C 1/00
See application file for complete search history.

(56) References Cited

U.S. PATENT DOCUMENTS

| | | | | |
|---|---|---|---|---|
| 3,168,449 | A * | 2/1965 | Hollenbeck | C12C 1/00 426/64 |
| 3,897,569 | A * | 7/1975 | Horgan | C12C 1/047 426/28 |
| 4,428,967 | A * | 1/1984 | Goering | C08B 37/00 127/38 |
| 2003/0148012 | A1* | 8/2003 | Scott | C12C 1/18 426/618 |
| 2020/0063931 | A1* | 2/2020 | Song | H05B 47/16 |

OTHER PUBLICATIONS

Zenklusen et al., "Inactivation of Aspergillus carbonarius and Aspergillus flavus in malting barley by pulsed light and impact on germination capacity and microstructure." published online Sep. 13, 2017. Innovative Food Science and Emerging Technologies 45:(2018);161-168. (Year: 2017).*

(Continued)

*Primary Examiner* — Robert J Yamasaki
*Assistant Examiner* — Charles Zoltan Constantine
(74) *Attorney, Agent, or Firm* — Dinsmore & Shohl LLP (57) ABSTRACT

This disclosure relates to methods to increase hydrolytic enzyme activity in a barley grain. The methods include application of photon energy to barley grain during the germination period of a malting process. The applied photon energy causes a stress to the barley grain that is sufficient to increase enzymatic levels and/or reduce the germination period.

14 Claims, 3 Drawing Sheets

(56) References Cited

OTHER PUBLICATIONS

Zenklusen, ("Inactivation of Aspergillus carbonarius and Aspergillus flavus in malting barley by pulsed light and impact on germination capacity and microstructure" Innovative Food Science and Emerging Technologies Innovative Food Science and Emerging Technologies 45 (2018) 161-168) (Year: 2018).*

Song ("Microorganism inactivation by continuous and pulsed irradiation of ultraviolet light-emitting diodes UV-LEDs", Chemical Engineering Journal 343 (2018) 362-370). (Year: 2018).*

AMBA (American Malting Barley Association); "Malting Barley Breeding Guidelines"; ambainc.org/wp-content/uploads/2021/07/Malting-Barley-Breeding-Guidelines_2021_June.pdf; Jun. 2021.

Arsovski et al; "Photomorphogenesis"; The *Arabidopsis* Book/American Society of Plant Biologists, 2012; DOI: 10.1199/tab.0147; e0147, pp. 1-10.

Bhavya et al; "Pulsed light processing of foods for microbial safety"; Food Quality and Safety, 2017; 1(3), pp. 187-202.

Calabrese et al; "Hormesis and plant biology"; Environmental Pollution; 2009; 157(1); DOI: https://doi.org/10.1016/j.envpol.2008.07.028; pp. 42-48.

Canadian Malting Barley Technical Centre; 2021-2022 Recommended Malting Barley Varieties; 2021; http://cmbtc.com/cmbtc-issues-2021-22-recommended-malting-barley-varietieslist/; Accessed Jul. 1, 2021.

Caverzan et al; "Reactive Oxygen Species and Antioxidant Enzymes Involved in Plant Tolerance to Stress"; http://www.intechopen.com/books/Abiotic-and-Biotic-Stress-in-Plants-Recent-Advances-and-Future-Perspectives; InTech; 2016; pp. 463-480.

Edney et al; "Evolution of a quality testing program for improving malting barley in Canada"; Canadian Journal of Plant Science; 2014; 94(3); DOI: 10.4141/DJPS2013-118; pp. 535-544.

Environmental Growth Chambers; "Lighting Radiation Conversion"; http://www.egc.com/useful_info_lighting.php; Jul. 14, 2022; pp. 1-2.

Hasan et al; "An Overview of LEDs' Effects on the Production of Bioactive Compounds and Crop Quality"; www.mdpi.com/journal/molecules; Molecules; 2017; 22(9); 1420; pp. 1-12.

Heisel et al; Malting Barley Characteristics for Craft Brewers; American Malting Barley Association Inc; Personal Communication; 2014; pp. 1-6.

Izydorczyk et al; "Barley: Grain-Quality Characteristics and Management of Quality Requirements"; Cereal Grains http://dx.doi.org/10.1016/B978-0-08-100719-8.00009-7; Woodhead Publishing; 2017; pp. 195-234.

Jagadeesh, et al; Influence of Postharvest UV-C Hormesis on the Bioactive Components of Tomato During Post- Treatment Handling; Food and Bioprocess Technology; 2011; 4(8); pp. 1463-1472.

Kim et al; "Ice Plant Growth and Phytochemical Concentrations are Affected by Light Quality and Intensity of Monochromatic Light-Emitting Diodes"; Horticulture, Environment, and Biotechnology; 2018; 59(4); doi:10.1007/s13580-018-0058-3; pp. 529-536.

Krasauskas; "Fungi in malting barley grain and malt production"; Biologija; 2017; 63(3); pp. 283-288.

Lopez and Runkle; "Making Sense of Light Sensors"; gpnmag.com; Feb. 2021; pp. 28-30.

Manivannan et al; "Blue LED Light Enhances Growth, Phytochemical Contents, and Antioxidant Enzyme Activities of Rehmannia glutinosa Cultured In Vitro"; Hor. Environ. Biotechnol.; 56(1); 2015; DOI: 10.1007/s13580-015-0114-1; pp. 105-113.

Muller et al; "An accelerated malting procedure—influences on malt quality and cost savings by reduced energy consumption and malting losses"; Journal of the Institute of Brewing 2015; 121(2); wileyonlinelibrary.com; DOI:10.1002/jib.225; pp. 181-192.

Naznin, et al; "Different ratios of red and blue LED light effects on coriander productivity and antioxidant properties"; Acta Hortic; 1134; ISHS, 2016; DOI: 10.17660/ActaHortic.2016.1134.30; pp. 223-230.

Okeke et al; "Design of light-emitting diodes (LEDs) powered chamber for study of optimization of barley malt Diastatic (fermentation) power and bioactive compounds for food production"; 2020 ASABE Annual International Virtual Meeting (p. 1); DOI: https://doi.org/10.13031/aim.20; American Society of Agricultural and Biological Engineers; 2020; pp. 1-6.

Rocha et al; "Light-emitting Diodes and BAP Concentrations in the In Vitro Strawberry Multiplication"; Ciência Rural; 2010; 40(9); pp. 1922-1928.

Saebo et al; "Light quality affects photosynthesis and leaf anatomy of birch plantlets in vitro"; Plant Cell, Tissue and Organ Culture; 41; 1995; http://dx.doi.org/10.1007/BF00051588; pp. 177-185.

Van Donkelaar et al; "Pearling barley to alter the composition of the raw material before brewing"; Journal of Food Engineering; 2015; 150; pp. 44-49.

Wang et al; "β-glucans and Arabinoxylans"; Genetics and improvement of barley malt quality; Eds (Zhang, G, & Li, C); Chapter 5. Springers; 2010; pp. 113-143.

Zhu et al; "Effect of Germination and Extrusion on Physicochemical Properties and Nutritional Qalities of Extrudates and Tortilla from Wheat"; Institute of Food Technologies, 2017; Journal of Food Science; 2017; vol. 00, Nr 0; DOI: 10.111/1750-3841.13797; pp. 1-9.

* cited by examiner

PHOTON-INDUCED ACCELERATED ENZYMES AND BIOACTIVE COMPOUNDS ACCUMULATION IN BARLEY DURING MALTING

RELATED APPLICATIONS

This application claims priority to U.S. Provisional patent application 63/220,724, filed Jul. 12, 2021, the contents of which are hereby incorporated by reference in their entirety.

FIELD OF THE INVENTION

This disclosure relates to methods for increasing the rate of the accumulation of hydrolytic enzymes and bioactive compounds in seeds, allowing for a shorter germination period during malting.

BACKGROUND

Barley is the traditional grain for producing malt because it is naturally endowed with the complete hydrolytic enzyme profiles needed to break down complex compounds into a simple compound needed by yeast during the fermentation process. Malt is a major ingredient in the production processes of several alcoholic (brewing and distilling) beverages and confectionery products. Malt is important in the alcoholic beverage industry because it contains important hydrolytic enzymes that are needed for breaking down the larger molecules in grains. Malt is also a source of important nutrients needed for yeast activities like protein and carbohydrates. A measure of malt quality is the quantity of enzymes synthesized and accumulated during the malting processing, specifically, during the germination phase. A good malt also has increased health benefits from increased accumulation of bioactive compounds. These health benefits and some other desired quality features including flavor, aroma, color, extractable polyphenol, and others led to the exploration of optimizing the different processes and conditions that can improve malt quality. Among the malting processes, the germination stage after steeping and before termination by kilning is one of the most crucial stages for malt modification. A goal of the malting process targets is to maximize the presence of hydrolytic enzymes present in the grains to catalyze the modifications that produce better dry malt. Needs for improving hydrolytic enzyme concentration and/or activity are therefore desired.

BRIEF DESCRIPTION OF THE DRAWINGS

FIG. 3A shows barley with blue LED light treatment. FIG. 3B shows barley with red LED light treatment. FIG. 3C shows barley with 50% red and 50% blue LED light treatment.

DETAILED DESCRIPTION

The present disclosure concerns methods to increase hydrolytic enzymes in barley grains. In some aspects, the method increases enzyme concentration. In other aspects, the methods can increase enzymatic activity. In some aspects, the methods of the present disclosure concern methods to reduce the germination time of barley grains during a malting process. In some aspects, the present methods concern application of a photon-induced stress to barley grains to increase hydrolytic enzyme expression/activity and/or reduce germination time.

In some aspects, the methods of the present disclosure concern application of abiotic stress to barley grains during germination. Barley (*Hordeum vulgare* L.) is a cereal and the traditional grain for malting that mostly targets the alcoholic beverage industries (distilling and brewing), and other food manufacturing applications (Krasauskas, 2017; Izydorczyk & Edney, 2017; FAO, 2021). This is so because barley's seed aleurone layer and endosperm are capable of rapid production of the hydrolytic enzymes that are needed for a polymeric compound breakdown during most of the production processes (brewing and distilling) in sufficient quantity. No other grain is so uniquely endowed (Edney, MacLeod & LaBerge, 2014; Izydorczyk and Edney, 2017). Beyond being used as animal feed, barley's preferred application is in making malt for brewing and distilling where higher-priced malts are inviting to processors (van Donkelaar et al., 2015; Izydorczyk & Edney, 2017). The primary process in malting (steeping, germination, and kilning) takes between 6 to 9 days, and a reduction of a half or full-day could substantially increase return for the malt producers. The main measures of malt quality are the level of mobilized and synthesized exohydrolases and amylases (beta and alpha-amylases, respectively), the level of beta-glucan (β-glucan), and the quantity of bioactive compounds (Burton, Collins, and Fincher, 2010). The desired levels vary by application, but it is generally desirable to have maximum extract yield instigated by sufficient hydrolytic enzyme concentration in the barley malt (BM) (Wang and Zhang, 2010). All these factors can be optimized during the three stages of malting. In some aspects, the barley grains germination is a part of phases of malting. In some aspects, the malting process may include an initial phase of hydrating or steeping the barley grains, a middle phase of allowing the barley grains to germination and a final phase to dry and/or kiln the barley grains to arrest germination. In some aspects, barley grains are germinated to where about 75% of the dimension of the seed is the length of the hypocotyl.

In some aspects, the present disclosure concerns application of photon energy to plant seeds. While barley is used as an exemplary seed herein, it will be appreciated that other crop seeds can similarly be treated in order to generate a stressful environment within the seed. In some aspects, the methods of the present disclosure concern utilizing an applied stress to reduce germination time and/or increase hydrolytic enzyme presence in barley grains. The suggested mechanism by which enzyme accumulation is induced and modulated is based on the production of reactive oxygen species (ROS) in a plant or growing seed when exposed to a stressful environment like lighting (Caverzan, Casassola, & Brammer, 2016). ROS can cause severe damage to plant physiology and they are toxic to the plant. The sustenance of equilibrium between the production and detoxification of ROS is based on the counter-effect of non-enzymatic and enzymatic antioxidants (Caverzan et al., 2016; Kim et al., 2018). This dose-response phenomenon is called hormesis (Calabrese & Blain, 2009).

In some aspects, the present disclosure concerns the application of a photon stressor to barley grains. In some aspects, the photon stressor is applied to barley grains during germination or at least during germination. In some aspects, the photon stressor is applied once the seeds have been hydrated and/or steeped to attain a wet basis of at least about 35%, including 40, 45, 50, 55, 60, 65, and higher. As described herein, application of photon stressors can be applied to barley grains in a number of manners and over varying time periods, which results in reduced germination time and/or increased levels of hydrolytic enzymes within the barley grains. In some aspects, the application of a photon stressor during germination of a barley seed can increase the concentration of alpha amylase, beta amylase or both. In some aspects, the photon stressor is from a light source. The application of photons as a stressor, such as through application of light, during germination not only has the potential to increase hydrolytic enzyme accumulation but can increase reactive antioxidant content, which is produced as a way to balance the impact of ROS in plants subjected to significant abiotic stress. In comparison, some of the reactive compounds (e.g., γ-aminobutyric acid or GABA, ferulic acid, and γ-oryzanol) produced when a grain such as barley is stressed are known to have significant health benefits, and this portends added merits for subjecting a germinating seed for malt production to photons that can increase them (Jagadeesh et al., 2011; Maharaj, 2015; Zhu, Adedeji, & Alavi, 2017).

In some aspects, the photon stressors are applied in the form of light energy. The light energy can be application of light from a light-emitting diode, filament bulb light, ultraviolet light or cold plasma light. For example, the use of light-emitting diodes (LED) has several merits over a conventional white light source that include low thermal output, low energy usage, longevity, variable intensity, high photoelectric conversion efficiency and durability (Al-mayahi & Waheed, 2016; Rocha, Oliveira, Scivittaro, & Santos, 2010). In some aspects, the photon stressor can be applied from a single source, such as one or more LEDS, one or more UV lights, a cold plasma or nonthermal plasma device. Cold plasma devices may include those that operate using a dielectric barrier discharge or non-equilibrium atmospheric pressure plasma jets. In other aspects, the photon stress can be applied from more than one source, such as LEDs and/or UV lights, LEDs and a cold plasma device, UV lights and a cold plasma device, or LEDs, UV lights and a cold plasma device. Such may be arranged to provide the stress in combination, intermittently or in overlapping fashions. In some aspects, the photon-stressor can be applied constantly. In some aspects, the photon-stressor can be applied intermittently or periodically. In some aspects, the photon-stressor can be pulsed.

In some aspects, the present disclosure concerns application of photon energy to germinating barley grains to provide a stress to the developing grain. It will be appreciated that the applied photon energy should be of sufficient intensity and/or duration to provide a causative or noticeable stress on the barley grain. Photon energy can be achieved through a number of applications, with applied light being a common and affordable approach. However, any photon source can be considered, as long as the threshold level of stress or insult is applied to the germinating barley grain. In some aspects, the parameters of photon energy should provide the right quality, intensity and photoperiod to achieve shortened germination and/or increased hydrolytic enzyme production. It will also be appreciated that different sources can provide different outputs of photon energy, and as such, conditions may vary depending on the source. For example, UV or cold plasma may have a higher energy output, and as such may be applied less frequently or for shorter periods of time. In some aspects, the photon energy may be pulsed at the barley grain to achieve the desired level of stress to the barley grain.

In some aspects, the photon energy should of sufficient quantity or intensity, such as a red light that is of about 630 to about 700 nm, far-red that is of about 705 to about 740 nm, blue that is of about 400 to about 450 nm, and/or UV that is of about 315 to about 400 nm. In some aspects, the photons are applied over a period of length or of exposure time to the insult or stressor. In aspects where light is utilized as the photon energy, the exposure time or photoperiod refers to the duration of exposure, pattern of exposure, number of exposures, and/or overall length of exposure.

In some aspects, light is utilized as the photon energy source. Light intensity can be determined from the Photosynthetically Active Radiation (PAR), which is measured in the range of 400-700 nm, and is used by plants for photosynthesis and is very important during the germination period, and the more light the more photosynthesis limited to a given point. The amount of energy (photons or particles of light) hitting a square meter every second—micromoles per square meter per second ($\mu mol/m^2/s$) is used to measure the light intensity or quantity (Singh, Basu, Meinhardt-Wollweber, & Roth, 2015).

In some aspects, light intensity II) can be measured as Watts/area or Watts/$m^2$, or:

$$I = W/A \text{ (watts/}m^2) \quad (1)$$

which follows the inverse square law formula for light intensity being inversely proportional to the square of the distance or:

$$I \alpha \frac{1}{d^2}. \quad (2)$$

Accordingly, the intensity at different distances follows as:

$$\frac{I_1}{I_2} = \frac{d_1^2}{d_2^2} \quad (3)$$

Where:
$I_1$=light intensity at distance 1
$I_2$=light intensity at distance 2
$d_1$=distance 1 from the light source (m)
$d_2$=distance 2 from the light source (m).

These equations can be applied to approximately determine the intensity of light at a given distance or height. To obtain light intensity in micromoles per square meter per second ($\mu mol/m^2/s$), a conversion rate of watts/$m^2$=4.57 $\mu mol/m^2/s$ is applied based on plant growth chamber handbook (Sager & McFarlane, 1997). As set forth in the examples below with an arranged framework that was designed to meet an estimated range in light intensities between about 45 $\mu mol/m^2/s$ to about 350 $\mu mol/m^2/s$ that could be achieved by changing the height of the LEDs from the germination barley grain. In some aspects, light intensity of about 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 301, 310, 315, 320, 325, 330, 335, 340, and 345 $\mu mol/m^2/s$ is applied to barley grain. In some aspects, the applied photon energy is constant and maintained over a period of time. In other aspects, the level of energy applied can vary over a time course. In some aspects, the photon energy is applied for a period of about 1 to about 24 hours, including about 2, 3, 4, 5, 6, 7, 8, 9, 10, 11, 12, 13, 14, 15, 16, 17, 18, 19, 20, 21, 22, and 23 hours. In some aspects, a period of treatment can include periods of applied photon energy interspersed with recovery periods. For example, if a period of treatment is for an hour, the applied photon energy may be applied for 15 minutes, with 15 minutes rest, or for 15 minutes and 5 minutes rest. The various combinations with such patterns are apparent.

As also set forth in the examples herein, varying types of photon energy were examined through the use of different types of light quality application. The light quality includes a red and blue LED. Red (R) light has wavelengths between about 630-700 nm and blue (B) light is at 400-450 nm with a spectra ratio for R=66.57% and B=22.9% (the output spectrum test report for the LEDs (spectra ratio) was provided by the LED manufacturer). As set forth in the working examples, each type of photon energy can be applied either in isolation or in combination. For example, red light can be applied, blue light can be applied, and red and blue light together can be applied.

In some aspects, the application of photon energy to the barley grain can increase the diastatic power within the barley grains. As set forth in the working examples, when a photon energy of about 120 to about 150 W/m² or mol/m²/s is applied to the barley grain at 12 hour intervals, the diastatic power of the barley grain is above 150°L, including values above 160, 165, and 170°L. As further set forth in the working examples, photon energy can decrease β-glucan degradation rates within the barley grain during germination. In some aspects, it may be desirable to provide higher amounts of β-glucan in the barley grain by reduced degradation, particularly for applications as a food additive. In such aspects, it may be considered to arrest the germination period earlier and/or apply a higher intensity of photon energy. For example, the higher the light intensity energy applied, the greater the level of β-glucan present. Similarly, as demonstrated herein, the longer the germination period, the lower the levels of β-glucan present.

In some aspects, ultraviolet light can be pulsed at the seed over a period of time or as a single burst or as a continuous stressor. In some aspects, the ability provide the stressor photon energy in concentrated pulses reduces the need to provide constant space required for constant stressing. For example, a 12 hour continuous LED application requires maintaining the treated seeds in a flat and dispersed space to ensure equal or non-equal exposure. Pulsing higher photon energy allows for the same effective overall photon energy treatment without requiring the same space for a constant prolonged period of time.

In some aspects, the photon energy can be pulsed in bursts that provide between about 500 to about 3000 V to the seed, including about 600, 700, 800, 900, 1000, 1100, 1200, 1300, 1400, 1500, 1600, 1700, 1800, 1900, 2000, 2100, 2200, 2300, 2400, 2500, 2600, 2700, 2800, and 2900 V. In some aspects, UV can be pulsed at seeds to about 90 to 150 J/cm², including about 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 and 150 J/cm². As set forth in the examples, UV light was pulsed at a distance of about 8 to about 12 cm, including about 9, 10, and 11 cm, from the seeds at 2433 Joules/pulse (frequency was 0.29 Hz), effectively providing 107 J/cm², which is similar to 100-150 μmol/m²/s over 12 hours (94-142 J/cm²) in the LED system, where 1 W/m² is 4.57 μmol/m²/s. This level of treatment achieves the desired diastatic power of about 150°L or more in 3-4 days.

In some aspects, the photon energy can be applied to the barley grain in combination with another stressor, such as temperature exposure, chemical contact, salt exposure, water exposure, and wounding. As identified above, chemical stressors may include compounds such as GABA, ferulic acid, and/or γ-oryzanol. Additional stressors may be applied to the barley grain during germination along with or in isolation from the applied photon energy stressor. In some aspects, additional stressors may be applied at other points during the malting process, such as during the hydration stage. For example, increasing the water temperature of the steeping bath during the hydration step of the malting process can provide an additional stressor, followed by which the barley grain can be exposed to photon energy during the germination step. In some aspects, the steeping process can occur at a temperature of from about 15 to about 25° C., including about 16, 17, 18, 19, 20, 21, 22, 23, and 24° C.

In some aspects, the germination step of the malting process can include other treatments and/or conditions therein. For example, the germination may be allowed to progress at a desired temperature and/or humidity. Germination may also include adding moisture to the barley grains, such as spraying or re-soaking in water or submerging in water for a determined period of time and/or at predetermined intervals.

In some aspects, the methods may include freezing and/or storing the barley at a temperature of about 4° C. or lower to cease all enzymatic activity prior to kilning. In some aspects, the barley seed is placed in an environmental temperature of about 0, −5, −10, −15, −20, −25, −30, −35, −40, −45, −50, −55, −60, −65, −70, −75, −80, −85° C. or lower.

In some aspects, the present disclosure may also include kilning or heating of the barley grains following germination. As identified herein, the application of photon energy to the barley grain during germination may shorten the period required for germination thereby allowing the malting process to proceed to a heating or kilning step in a shorter period of time. In some aspects, the application of photon energy may allow the germination process to be reduced by between 1, 2, and 3 days, allowing the kilning process to begin between 1 to 3 days earlier. In some aspects, the kilning can be achieved over one, two, or more stages. In some aspects, kilning may be at about 50° C. for a first stage and at about 75° C. for a second stage. In some aspects, the barley is kilned until the moisture content is of about 5% wet basis or less. It will also be appreciated that other process, such as freeze-drying may similarly provide the cessation of enzymatic activity and the desiccation of the crop.

EXAMPLES

A specific objective was to determine the effect of the magnitude of photon energy from three types of LED lights, and germination time (0 to 5 days) on diastatic power (DP) and GABA level in malted barley.

Materials and Experimental Design: The experimental set-up was a factorial design where a two-row barley variety donated by South Fork Malthouse in Cynthiana Kentucky was used. Keeping every other malting process constant, steeping (24 h at 15° C., and kilning (three steps of 45°, 700 and 82° C. for 10, 8 and 6 h, respectively), a factorial experiment was designed where the impact of three types of LED lights, namely Red, Blue, and Combined Red and Blue (1:1) at six levels of intensity (0, 75, 100, 120, 150 and 200

Figure 1:
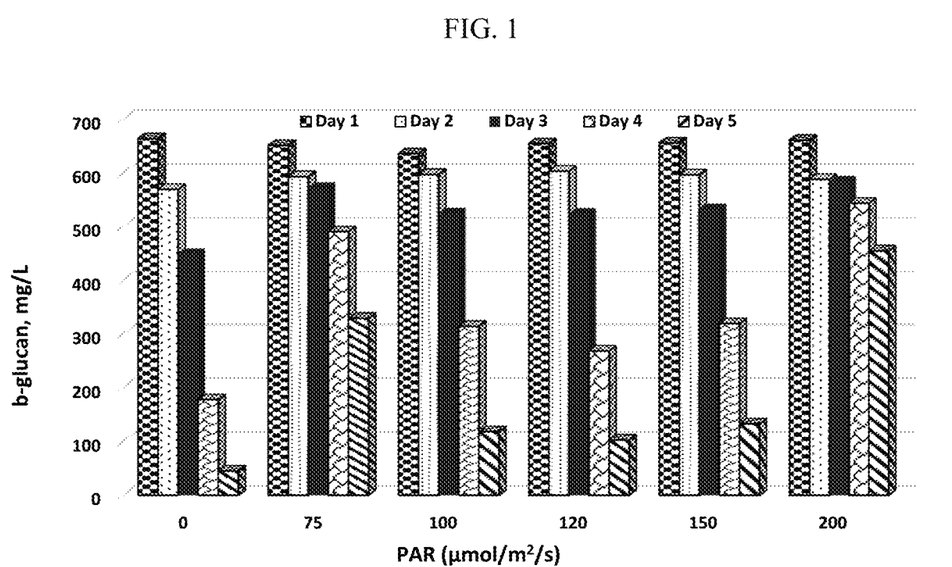
FIG. 1 shows β-glucan levels in red LED light treated barley.
Figure 2:
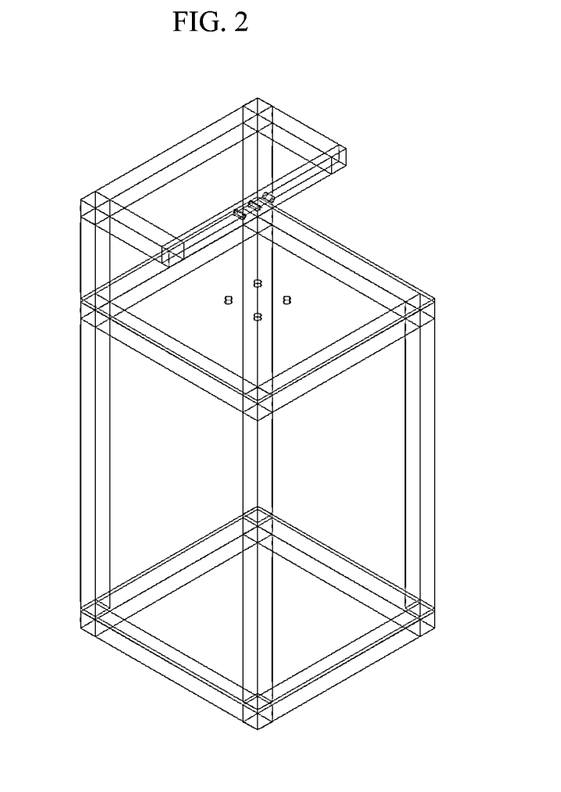
FIG. 2 shows a 3D view of a chamber for applying photon energy to barley grain with adjustable height.

(µmol/m²/s or W/m²) and for a five-day germination period where we maintained a 1:1 ratio for the photoperiod (12-h day:12-h exposure to light) were tested. Germination was carried out in a wooden system e-fabricated in-house (FIG. 2). All experiments were conducted in a controlled environment chamber kept at 15° C. and 95% relative humidity (FIG. 1). The seeds were generously sprayed with water at 6-8 h intervals, and samples were collected every day for a five-day germination period. All other materials such as reagents were sourced from the appropriate vendors like VWR and Sigma Aldrich.

The results indicate that optimized DP level (163.9°L and 163.4°L; 171.5°L and 171.1°L; 157.1°L and 149.3°L) were attained consistently across 120 and 150 µmol/m²/s on day three of germination for Blue, Red and Combined (Red and Blue), respectively (Table 1).

TABLE 1

Diastatic Power (°L) of barley malt treatments

| LED Light | Germination Days | PAR (µmol/m²/s) | | | | | |
|---|---|---|---|---|---|---|---|
| | | 0 | 75 | 100 | 120 | 150 | 200 |
| | | Diastatic Power, °L | | | | | |
| Red | 1 | 96.7 | 102.6 | 117.5 | 99.5 | 104.7 | 100.2 |
| | 2 | 143.8 | 141.9 | 141.8 | 154.6 | 150.1 | 139.4 |
| | 3 | 139.7 | 168.5 | 144.6 | 171.5 | 171.1 | 141.0 |
| | 4 | 119.0 | 148.2 | 176.3 | 131.4 | 144.1 | 143.0 |
| | 5 | 99.9 | 133.2 | 128.5 | 142.7 | 116.9 | 133.9 |
| Blue | 1 | 96.7 | 103.6 | 115.5 | 140.9 | 107.6 | 101.5 |
| | 2 | 143.8 | 130.9 | 144.3 | 100.8 | 144.2 | 135.6 |
| | 3 | 139.7 | 142.6 | 144.4 | 163.9 | 163.4 | 156.8 |
| | 4 | 119.0 | 142.5 | 148.3 | 138.4 | 151.3 | 164.4 |
| | 5 | 99.9 | 145.6 | 150.3 | 144.3 | 149.9 | 153.9 |
| Red + Blue | 1 | 96.7 | 105.8 | 102.1 | 114.9 | 115.9 | 105.6 |
| | 2 | 143.8 | 145.9 | 130.2 | 125.3 | 135.9 | 133.5 |
| | 3 | 139.7 | 140.3 | 142.8 | 157.1 | 149.3 | 138.4 |
| | 4 | 119.0 | 131.7 | 136.6 | 143.2 | 140.4 | 141.9 |
| | 5 | 99.9 | 114.5 | 127.9 | 127.5 | 128.8 | 154.0 |

These levels are significantly higher than the DP after same period of germination for the control. They are higher than the average level desired in brewers' and distillers' malt (110-150) (Heissel, 2014; American Malting Barley Association (AMBA, 2021). Some distillers prefer higher DP (≥200°L) because they use a significant number of adjuncts in their process, which often an exception and mostly from six-row barley that are smaller in size. The malting industry has moved away from six-row barley to two-row because of improvement in the breed (AMBA, 2021; Canadian Malting Barley Technical Centre, 2021). In the current project, care will be taken to select the barley variety that optimizes for DP. These results also indicate that optimal DP are instigated by Red LED light, and the combined Red and Blue LED is the least effective. This is a unique discovery in this study, and it further confirmed that measured exposure of barley seed to some abiotic stress during germination can speed up the process to optimize enzyme accumulation and synthesis. Beyond LED light, we intend to explore exposure of barley to other forms of abiotic stressors like pulsed ultra-violet (UV) light and cold plasma, which are proven treatments that increase the level of reactive oxygen species which in turn increase both non-antioxidant and antioxidant enzymes (Caverzan et al., 2016; Kim et al., 2018).

Figure 3:
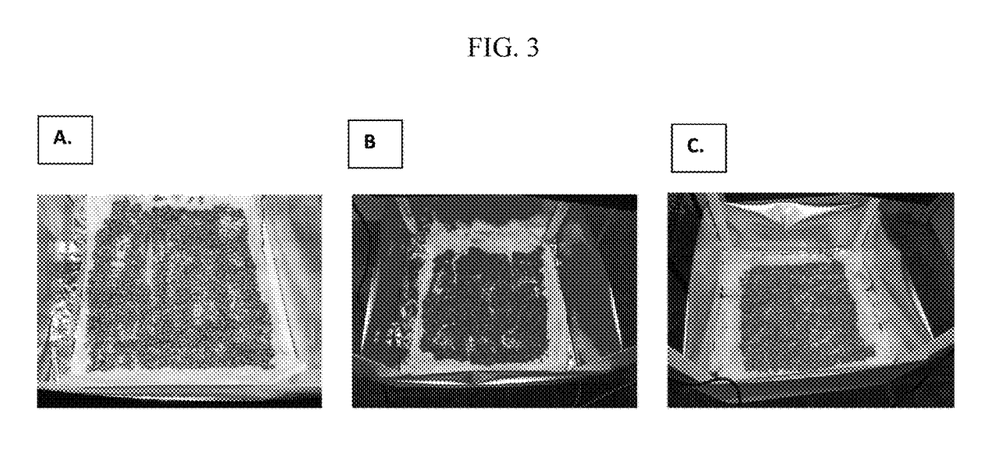
FIG. 3 shows barley samples after varying treatments.

The β-glucan level ranged between 45-673 mg/L (ppm) for all the samples. The lowest range was found in the control, and it diminished from 664 ppm to 45 ppm on day 5 of germination. This is a common trend across all treatments (FIG. 3). β-glucan is a major constituent of the cell walls in the endosperm, and it supposed to be degraded as the β-glucanase enzyme is released during germination. Generally, β-glucan levels were lower by the fifth day of germination, indicating significant degradation as a function of period of germination. β-glucan level is a major quality determining factor for malt destined for brewing where the presence of β-glucan could cause a significant problem during filtration because they form a complex with the arabinoxylan (pentosans) that clogs beer filters. The desired range for both brewing and distilling should be less than 120 ppm (Heissel, 2014; AMBA, 2021). The β-glucan numbers we obtained are unusually higher than expected for all the treatments, especially on days 3 and 4 when higher DP were recorded. Temperature and moisture content are two factors that can influence the rate of germination and enzymatic activities during this process. High germination temperature may reduce β-glucan level but leads to significant malting loss (Müller & Mether, 2015).

While low-level β-glucan (<100 mg/L) is desired in beer and spirits making, high content is desired in human foods because of its health benefits (Sullivan, Arendt & Gallagher, 2013). The β-glucan market is estimated at almost $0.403 billion today and it is projected to grow at a CAGR of 7.6% by 2026 (Marketsandmarkets.com, 2021).

The obtained results (Table 2) also indicate that there is a significant effect ($P<0.05$) of LED light exposure on GABA synthesis during the malting process. The range of values obtained was from 1679 to 31.81 mg/100 g of sample. High light intensity at 150-200 µmol/m²/s reduced GABA from 22.6 to 21.7, 19.7 and 19.2 mg/100 g for Red, Blue and Red-Blue light, respectively at the end of day one of germination. However, the range increased significantly by day 4 and 5 of germination across all treatments, with the highest accumulation observed for Blue LED light on days 4 and 5 for 75 and 100 µmol/m²/s, respectively. These results confirm the effect of photon energy on increased bioactive compounds in germinating plants (Hasan et al., 2017).

TABLE 1

GABA content of the malted barley

| LED Light | Germination Days | PAR (µmol/m²/s) | | | | | |
|---|---|---|---|---|---|---|---|
| | | 0 | 75 | 100 | 120 | 150 | 200 |
| | | GABA (mg/100 g) | | | | | |
| Red | 1 | 22.60 | 20.80 | 23.07 | 20.90 | 16.79 | 19.73 |
| | 2 | 27.23 | 28.03 | 25.74 | 26.46 | 24.53 | 23.85 |
| | 3 | 26.39 | 27.76 | 22.85 | 29.47 | 24.37 | 24.77 |
| | 4 | 27.97 | 24.28 | 27.86 | 29.36 | 29.50 | 27.17 |
| | 5 | 23.48 | 28.74 | 29.22 | 25.68 | 23.66 | 28.98 |
| Blue | 1 | 22.60 | 20.78 | 22.17 | 25.55 | 21.27 | 21.68 |
| | 2 | 27.23 | 25.80 | 28.26 | 21.50 | 22.30 | 24.27 |
| | 3 | 26.39 | 29.00 | 29.56 | 28.51 | 24.08 | 21.22 |
| | 4 | 27.97 | 27.04 | 30.61 | 26.89 | 26.73 | 27.27 |
| | 5 | 23.48 | 31.81 | 29.85 | 30.20 | 26.24 | 23.81 |
| Red + Blue | 1 | 22.60 | 20.18 | 19.83 | 17.77 | 21.25 | 19.16 |
| | 2 | 27.23 | 24.91 | 25.56 | 23.88 | 24.82 | 24.03 |
| | 3 | 26.39 | 26.94 | 29.80 | 28.00 | 25.13 | 26.97 |
| | 4 | 27.97 | 26.73 | 27.32 | 25.64 | 28.52 | 29.30 |
| | 5 | 23.48 | 28.47 | 23.94 | 25.35 | 25.35 | 22.38 |

This study proved that application photon energy in form of light from LED sources can increase abiotic stress level in germinating barley seed during malting, thereby leading to accelerated accumulation and synthesis of important hydrolytic enzymes and bioactive compounds. The level of some of the important quality indices of barley malt like DP and GABA content obtained on day three of LED treated samples against day five of control indicate a similar or higher level. This is a significant discovery for the malting industry. High steeping and germination temperature may reduce β-glucan level (Müller & Mether, 2015). Also, in order to implement LED application at industrial scale, there will be a significant need for space. This may be a major challenge for the malting industry. A solution is to apply a similar photon source of energy (pulsed ultra-violet (UV) light) that supplies large burst of energy in a shorter time. The underlining principle is the same, however, the mode of application of the photon energy is what is different. Based on the understanding of how photon energy creates abiotic stress during photomporgenesis, similar or better result for DP and GABA levels are expected.

UV Light Pulsing

Pulsed ultra violet (UV) light was examined. The UV light system used (X1100, Xenon Corp., Wilmington, MA, USA) is capable of delivering up to 3000 V in single burs, allowing for the generation of large burst of photon energy in few pulses that last a few seconds to treat the seeds, creating enough stress to stimulated the production of reactive oxygen species (ROS) that in turn instigate rapid production of amylolytic enzymes (release [beta-amylases] and production [alpha-amylases]) and bioactive compounds. The amount of light delivered per unit area determines the effect it has on biological system.

After the initial hydration/steeping process at 15° C. for 24 hours when the seeds' moisture content was assured to have attained at 45% wet basis, the process was terminated. Four classes of photon treatments were applied to different group of steeped barley seeds to obtain a total of 12 treatments: the control (no UV treatment), the day 1 UV treatment, day 1 and 2 UV treatment, and day 1, 2, & 3 UV treatment. For each exposure time, nine pulses of UV treatment was applied per set of samples in a 12×17 cm container at about 10 cm from the UV light source. Each pulse delivered a magnitude of 2433 J per pulse. In total, the intensity of UV delivered was 107 $J/cm^2$/seed, which was calculated based on the equivalent of 120-150 $\mu mol/m^2/s$ delivered for 12 hours in the LED system, where 1 $W/m^2$ equals 4.57 $\mu mol/m^2/s$ (Sager and McFarlane, 1997). This range of treatment with the LED system produced the desired diastatic power (DP) result of 150°L or more in three to four days based on the above studies.

After the treatment, samples were germinated in a controlled environment chamber at ~90% relative humidity (RH) and 16° C.; samples were hydrated by spraying with de-ionized water at 12 hours interval throughout the duration of germination to maintain an average moisture content of about 40-45%. Treatments that required UV treatment were removed at the appropriate time before samples were collected on day 3 and 4. The process was terminated by an initial storage at −82° C. freezer in order to prepare all the treatments before the kilning (drying) step. Kilning was conducted in two stages at 50 and 75° C. for a duration of 12 hours each to attain a final moisture content of about 5% wet basis desired for long term stability of malts. Table 3 presents observed barley malt characteristics from UV treated barley.

TABLE 3

Barley Malt Characteristics from UV Treated Barley

| Treatments | Germination Duration | β-glucan, mg/L | S/T, % | Diastatic Power, ° L | Clarity |
|---|---|---|---|---|---|
| Treatment 1: Pre-Germination UV Treatment | Day 3 | 303 | 54.1 | 175 | clear |
| Treatment 2: Pre-Germination, Day 1 UV Treatment | Day 4 | 420 | 50.5 | 170 | clear |
| Treatment 2: Pre-Germination, Day 1 UV Treatment | Day 3 | 631 | 47.2 | 168 | clear |
| Control: - Post-germination | Day 3 | 761 | 46.9 | 166 | clear |
| Treatment 1: Pre-Germination UV Treatment | Day 4 | 818 | 44.6 | 159 | hazy |
| Treatment 1: Pre-Germination UV Treatment | Day 3 | 488 | 51.0 | 159 | clear |
| Control: - Pre-germination (Steeping Only) | Day 0 | 769 | 48.3 | 149 | clear |
| Treatment 4: Pre-Germination, Day 1, 2 & 3 UV Treatment | Day 4 | 717 | 48.7 | 145 | hazy |
| Control: - Post-germination | Day 4 | 1010 | 42.9 | 134 | hazy |
| Treatment 3: Pre-Germination, Day 1 & 2 UV Treatment | Day 3 | 998 | 44.5 | 134 | hazy |
| Treatment 4: Pre-Germination, Day 1, 2 & 3 UV Treatment | Day 3 | 975 | 37.2 | 81 | hazy |
| Treatment 3: Pre-Germination, Day 1 & 2 UV Treatment | Day 4 | 986 | 37.5 | 79 | hazy |
| Desired Range (AMBA, 2021)* | =<4 | <=100* | 40-47* | 110-150* | Clear |

Analysis of important parameters for malt quality determination according to the American Malting Barley Association standards (AMBA, 2021) were conducted at the Center for Craft Food and Beverage Laboratory in Hartwick College, New York. The diastatic power (DP) data from Table 3 proved that pulsed UV light is as effective as LED in inducing rapid enzyme activities in barley malt during germination. One and double treatments on day 0 and 1 increased DP rapidly by the third day of germination to a range above the acceptable point (110-150°L) for most brewing and distilling applications (AMBA, 2021). The turbidity (clarity) and protein level are within the acceptable range. However, the effort to reduce beta-glucan level, a component of the cell wall did not yield the desired result. The range for all desirable treatments was well above the <100 mg/L desired for mostly brewing application. This does not in any way preclude the claim that photon application pre- and post-germination could reduce the germination duration for the malting process. The barley obtained from this novel method has application in the distilling and confectionary industry. Beta-glucan is a type of soluble fiber with important health benefits. It is desired in high quantity in foods not destined for processes like brewing and causes no harm in distilled beverages or confectionaries.

The UV light system applies nine pulses to deliver enough photon energy at 0.26 Hz (i.e., 3.4 s/pulse for a total of 31 s for 9 pulses). This short duration of pulse application makes the implementation of this technology more amenable in a real setting in a continuous system with potential for high throughput. This is a significant improvement over the LED system initially reported.

The foregoing description of several aspects has been presented for purposes of illustration. It is not intended to be exhaustive or to limit the application to the precise forms disclosed, and obviously many modifications and variations are possible in light of the above teaching. It is understood that the disclosure may be practiced in ways other than as specifically set forth herein without departing from the scope of the disclosure. Any patents or publications mentioned in this specification are incorporated herein by reference to the same extent as if each individual publication is specifically and individually indicated to be incorporated by reference.

REFERENCES

Al-mayahi, A. M., & Waheed. (2016). *World Journal of Microbiology and Biotechnology*, 32(10), 1-8. doi:http://dx.doi.org/10.1007/s11274-016-2120-6.

AMBA (American Malting Barley Association). Malting barley breeding guidelines—see ambainc.org/wp-content/uploads/2021/07/Malting-Barley-Breeding-Guidelines_2021_June.pdf.

Arsovski, A. A., Galstyan, A., Guseman, J. M., & Nemhauser, J. L. (2012). Photomorphogenesis. *The Arabidopsis Book/American Society of Plant Biologists*, 10: e0147 1-10.

Bhavya, M. L., & Umesh Hebbar, H. (2017). Pulsed light processing of foods for microbial safety. *Food Quality and Safety*, 1(3), 187-202.

Calabrese, E. J., & Blain, R. B. (2009). Hormesis and plant biology. *Environmental Pollution*, 157(1), 42-48. doi: https://doi.org/10.1016/j.envpol.2008.07.028.

Canadian Malting Barley Technical Centre. (2021). 2021-2022 Recommended Malting Barley Varieties. http://cmbtc.com/cmbtc-issues-2021-22-recommended-malting-barley-varietieslist/. Accessed Jul. 1, 2021.

Caverzan, A., Casassola, A., & Brammer, S. P. (2016). Reactive oxygen species and antioxidant enzymes involved in plant tolerance to stress. In *Abiotic and biotic stress in plants—Recent advances and future perspectives*: InTech.

Edney, M. J., MacLeod, A. L., & LaBerge, D. E. (2014). Evolution of a quality testing program for improving malting barley in Canada. *Canadian Journal of Plant Science*, 94(3), 535-544.

Hasan, M., Bashir, T., Ghosh, R., Lee, S. K., & Bae, H. (2017). An overview of LEDs' effects on the production of bioactive compounds and crop quality. *Molecules*, 22(9), 1420.

Heissel, S. (2014). American Malting Barley Association Inc. *Personal Communication*.

Izydorczyk, M. S., & Edney, M. (2017). Barley: Grain-Quality characteristics and management of quality requirements. In *Cereal grains* (pp. 195-234). Woodhead Publishing.

Jagadeesh, S., Charles, M., Gariepy, Y., Goyette, B., Raghavan, G., & Vigneault, C. (2011). Influence of postharvest UV-C hormesis on the bioactive components of tomato during post-treatment handling. *Food and Bioprocess Technology*, 4(8), 1463-1472.

Kim, Y. J., Kim, H. M., Kim, H. M., Jeong, B. R., Lee, H.-J., Kim, H.-J., & Hwang, S. J. (2018). Ice plant growth and phytochemical concentrations are affected by light quality and intensity of monochromatic light-emitting diodes. *Horticulture, Environment, and Biotechnology*, 59(4), 529-536. doi:10.1007/s13580-018-0058-3.

Krasauskas, A. (2017). Fungi in malting barley grain and malt production. *Biologija*, 63(3).

Manivannan, A., Soundararajan, P., Halimah, N., Ko, C. H., & Jeong, B. R. (2014). Blue LED Light Enhances Growth, Phytochemical Contents, and Antioxidant Enzyme Activities of *Rehmannia glutinosa* Cultured In Vitro (Vol. 56).

Müller, C., & Methner, F. J. (2015). An accelerated malting procedure-influences on malt quality and cost savings by reduced energy consumption and malting losses. *Journal of the Institute of Brewing*, 121(2), 181-192.

Naznin, M. T., Lefsrud, M., Gravel, V., & Hao, X. (2016). Different ratios of red and blue LED light effects on coriander productivity and antioxidant properties.

Okeke, A. G., & Adedeji, A. A. (2020). Design of light-emitting diodes (LEDs) powered chamber for the study of optimization of barley malt diastatic (fermentation) power and bioactive compounds for food production. In *2020 ASABE Annual International Virtual Meeting* (p. 1). American Society of Agricultural and Biological Engineers.

Rocha, P. S. G. d., Oliveira, R. P. d., Scivittaro, W. B., & Santos, U. L. d. (2010). Diodos emissores de luz e concentrações de BAP na multiplicação in vitro de morangueiro. *Ciência Rural*, 40(9).

Saebo, A., Krekling, T., & Appelgren, M. (1995). Light quality affects photosynthesis and leaf anatomy of birch plantlets in vitro. *Plant Cell Tissue Organ Cult.* 41, 177-185

Sager, J. C., & McFarlane, J. C. (1997). Radiation. *Plant growth chamber handbook*, (340), 1-29.

van Donkelaar, L. H., Noordman, T. R., Boom, R. M., & van der Goot, A. J. (2015). Pearling barley to alter the composition of the raw material before brewing. *Journal of Food Engineering*, 150, 44-49.

Wang, J. M. and Zhang, G. P. (2010). β-glucans and arabinoxylans. In *Genetics and improvement of barley malt quality*. Eds (Zhang, G., & Li, C.). Chapter 5. Springers. Pp. 113-143.

Zhu, L., Adedeji, A. A., & Alavi, S. (2017). Effect of germination and extrusion on physicochemical properties and nutritional qualities of extrudates and tortilla from wheat. *Journal of food science*, 82(8), 1867-1875.

We claim:

1. A method for increasing hydrolytic enzyme activity in a barley grain during a malting process, comprising applying a photon energy to one or more barley seeds for a period of treatment during a germination step, wherein the period of treatment comprises nine pulses at 0.26 Hz of UV light at 3.4 s/pulse at the barley seed.

2. The method of claim 1, wherein the value of the applied photon energy is from about 100 to about 150 μmol/m$^2$/s.

3. The method of claim 1, wherein the applied photon energy is of about 100 to about 150 J/cm$^2$ of barley.

4. The method of claim 1, wherein photon energy is applied until the barley seed has a diastatic power of at least 150°L.

5. The method of claim 4, wherein the barley seed is germinated for a period of about 3 to 4 days.

6. The method of claim 1, further comprising kilning the barley seeds.

7. The method of claim 6, further comprising freezing the barley seed prior to kilning to terminate enzymatic activity.

8. The method of claim 6, wherein the barley seed is kilned in two stages at about 50° C. and about 75° C. over about 12 hours at each temperature for a total of 24 hours.

9. The method of claim 6, wherein the barley seed is kilned until the moisture content of the barley seed is of about 5% wet basis or less.

10. The method of claim 1, further comprising steeping the barley seed prior to the germination step at a temperature of from about 15 to about 25° C.

11. A method for achieving rapid accumulation of amylolytic enzymes within a seed, comprising application of photon energy to a germinating seed until the seed has a diastatic power of about 150°L or higher and wherein the photon energy comprises nine pulses at 0.26 Hz of UV light at 3.4 s/pulse from a UV light.

12. The method of claim 4, further comprising kilning the seed until the moisture content of the seed is of 5% or less.

13. The method of claim 11, wherein the seed is a barley seed.

14. A method for increasing hydrolytic enzyme activity in a barley grain during a malting process, comprising applying a photon energy comprising nine pulses at 0.26 Hz of UV light at 3.4 s/pulse to one or more barley seeds for a period of treatment during a germination step and then kilning the barley seeds.

* * * * *